(12) United States Patent
Elnozahy (10) Patent No.: US 8,381,028 B2
(45) Date of Patent: *Feb. 19, 2013

(54) ACCELERATING RECOVERY IN MPI ENVIRONMENTS

(75) Inventor: Elmootazbellah Nabil Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,917

(22) Filed: Apr. 16, 2012

(65) Prior Publication Data

US 2012/0226939 A1 Sep. 6, 2012

Related U.S. Application Data (63) Continuation of application No. 12/788,990, filed on May 27, 2010, now Pat. No. 8,250,405.

(51) Int. Cl.
*G06F 11/00* (2006.01)

(52) U.S. Cl. ........... 714/13; 714/10; 714/12; 714/15; 714/16; 714/31

(58) Field of Classification Search .......... 714/10, 714/12, 13, 15, 16, 31
See application file for complete search history.

(56) References Cited

U.S. PATENT DOCUMENTS

| | | | |
|---|---|---|---|
| 6,289,474 B1 | 9/2001 | Beckerle | |
| 7,293,200 B2 | 11/2007 | Neary et al. | |
| 7,516,361 B2* | 4/2009 | Vick et al. | 714/15 |
| 7,568,131 B2* | 7/2009 | Vertes | 714/45 |
| 7,613,597 B2* | 11/2009 | Vertes | 703/2 |
| 7,634,687 B2 | 12/2009 | Haselden et al. | |
| 7,681,075 B2* | 3/2010 | Havemose et al. | 714/15 |
| 7,770,064 B2* | 8/2010 | Harper et al. | 714/15 |
| 7,840,940 B2* | 11/2010 | Vertes | 717/120 |
| 8,078,910 B1* | 12/2011 | Backensto et al. | 714/15 |
| 8,132,190 B2* | 3/2012 | Vertes | 719/328 |
| 8,195,722 B1* | 6/2012 | Havemose et al. | 707/821 |
| 2008/0046696 A1* | 2/2008 | Vertes | 712/214 |
| 2008/0250145 A1 | 10/2008 | Sun | |
| 2009/0327807 A1* | 12/2009 | Varadarajan et al. | 714/15 |
| 2010/0017655 A1* | 1/2010 | Gooding et al. | 714/16 |
| 2011/0010392 A1* | 1/2011 | Wong et al. | 707/776 |

OTHER PUBLICATIONS

Scales et al; Transparent Fault Tolerance for Parallel Applications on Networks of Workstations, http://www.usenix.org, Proceedings of the USENIX 1996 Annual Technical Conference San Diego, California, Jan. 1996.

Woo et al; MPICH-GF: Transparent Check pointing and Rollback-Recovery for Grid-enabled MPI Processes, 1-15, School of Computer Science and Engineering, Seoul National University, Seoul, Korea.

Saleh et al, Efficient and Fault-Tolerant Checkpointing Procedures for Distributed Systems, 161-167, 1993, IEEE.

Bosilca et al; Algorithmic Based Fault Tolerance Applied to High Performance Computing, Manchester Institute for Mathematical Sciences School of Mathematics, http://www.manchester.ac.uk/mims/eprints, ISSN 1749-9097, 1-13, Manchester, UK.

\* cited by examiner

*Primary Examiner* — Joshua P Lottich
(74) *Attorney, Agent, or Firm* — Garg Law Firm, PLLC; Rakesh Garg; Eustus Nelson (57) ABSTRACT

A computer usable program product for accelerating recovery in an MPI environment is provided in the illustrative embodiments. A first portion of a distributed application executes using a first processor and a second portion using a second processor in a distributed computing environment. After a failure of operation of the first portion, the first portion is restored to a checkpoint. A first part of the first portion is distributed to a third processor and a second part to a fourth processor. A computation of the first portion is performed using the first and the second parts in parallel. A first message is computed in the first portion and sent to the second portion, the message having been initially computed after a time of the checkpoint. A second message is replayed from the second portion without computing the second message in the second portion.

10 Claims, 8 Drawing Sheets

ACCELERATING RECOVERY IN MPI ENVIRONMENTS

BACKGROUND OF THE INVENTION

1. Field of the Invention

The present invention relates generally to an improved data processing system, and in particular, to improving recovery from failures in distributed data processing systems. Still more particularly, the present invention relates to a computer usable program code for accelerating recovery in a message passing interface based distributed computing environment.

2. Description of the Related Art

When a failure occurs in a data processing system, it is desirable to reinitiate the data processing system from a known time of operation in the past. As a part of reinitiating the data processing system, data, processes, application status, and other information is restored to the known time in the past and the system operation recovered from that point in time. The known time is called a checkpoint. In other words, a checkpoint is a view of the data, processes, application statuses, and information in a data processing system at some time in the past.

In order to be able to accomplish a recovery operation from a checkpoint, the data, states, and other information existing in the data processing system at the checkpoint are saved from a memory to a highly available data storage system that can withstand failures, herein called stable storage. Such data, states, and other information at a checkpoint are collectively called checkpoint data.

Typically, checkpoint data is collected and saved at a number of checkpoints as a data processing system continues to operate. In case of a data processing system failure, a user or the system restores the data processing system operation from the most recently saved checkpoint by repopulating the data processing system with the checkpoint data.

In a distributed computing environment, an application may be distributed in such a way that portions of the application can execute on different processors in parallel in the distributed computing environment. A portion of an application executing on a processor may be designed in such a way that the portion can execute as a fully operational application on that processor. An application whose portions can execute in this manner is herein called a distributed application.

According to one method of implementing distributed applications, a portion of the distributed application executing on one processor interacts with other portions executing on other processors using messages. This method of interaction, communication, and computation is implemented using the Message Passing Interface (MPI). A distributed computing environment executing a distributed application by executing portions thereof on different processors, where the portions employ messaging for performing their computations, is herein called an MPI environment.

SUMMARY OF THE INVENTION

The illustrative embodiments provide a computer usable program product for accelerating recovery in an MPI environment. An embodiment causes a first portion of a distributed application to execute using a first processor and a second portion of the distributed application to execute using a second processor in a distributed computing data processing environment, the first and the second portions interacting using MPI. The embodiment restores, responsive to a failure of operation of the first portion of the distributed application, the first portion to a checkpoint. The embodiment distributes a first part of the first portion to a third processor and a second part of the first portion to a fourth processor in the distributed computing data processing environment. The embodiment performs a computation of the first portion using the first and the second parts in parallel. The embodiment computes a first message in the first portion, the message having been initially computed after a time of the checkpoint and before a time of the failure. The embodiment sends the first message to the second portion. The embodiment replays a second message from the second portion without computing to create the second message in the second portion.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Presently, when a portion of a distributed application executing on a processor experiences a failure, other portions of the distributed application executing on other processors have to be halted. The failed portion recovers to the last saved checkpoint and begins computations from the point in time when the checkpoint was taken.

Other portions engaged in messaging with the failed portion re-perform the computations to regenerate the messaging that occurred with the portions of the distributed application, including the failed portion. Thus, presently, several portions of a distributed application have to recompute messages lost between the time of failure and the time of the last checkpoint.

The invention recognizes that such a method of recovery in a MPI environment consumes time and computing resources and is therefore undesirable. The invention further recognizes that the present method is also undesirable because at least for the non-failing portions of the distributed application, the resources are consumed for re-performing those computations that have already been performed successfully before the failure. Thus, the invention recognizes that not only computing resources are consumed, but also that they are consumed for generating no new results or reaching states not already reached.

For convenience, a portion of a distributed application is herein called an application. All portions, or applications, that are part of a distributed application, are collectively referred to as the distributed application. A set of portions or applications is one or more portions or applications.

An application may execute on a set of processors in the distributed computing environment. A set of processors is one or more processors. For example, several images or copies of the application may execute on different processors. As another example, a data processing system that participates in the distributed computing environment and executes the application thereon may be a multi-processor system.

The illustrative embodiments used to describe the invention generally address and solve the above-described problems and other problems related to recovery in distributed computing environments. The illustrative embodiments of the invention provide a method for accelerating recovery in a MPI environment.

The illustrative embodiments are described with respect to data, data structures, and identifiers only as examples. Such descriptions are not intended to be limiting on the invention. For example, an illustrative embodiment described with respect to one type of message may be implemented using a different message in a different configuration, in a similar manner within the scope of the invention. Generally, the invention is not limited to any particular message set that may be usable in a MPI environment.

Furthermore, the illustrative embodiments may be implemented with respect to any type of data processing system. For example, an illustrative embodiment described with respect to a processor may be implemented in a multi-core processor or a multiprocessor system within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention.

An implementation of an embodiment may take the form of data objects, code objects, encapsulated instructions, application fragments, distributed application or a portion thereof, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, files, file systems, logs, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
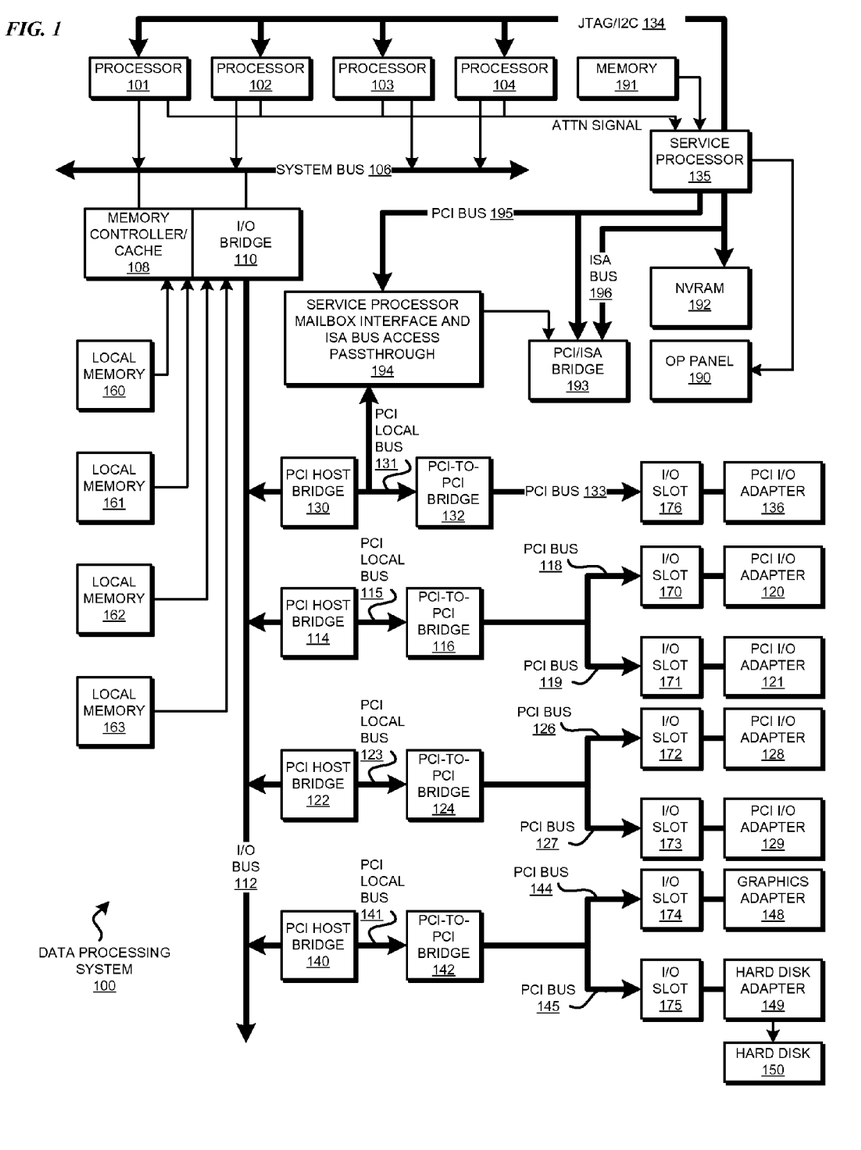
FIG. 1 depicts a block diagram of a data processing system in which the illustrative embodiments may be implemented is depicted.
Figure 2:
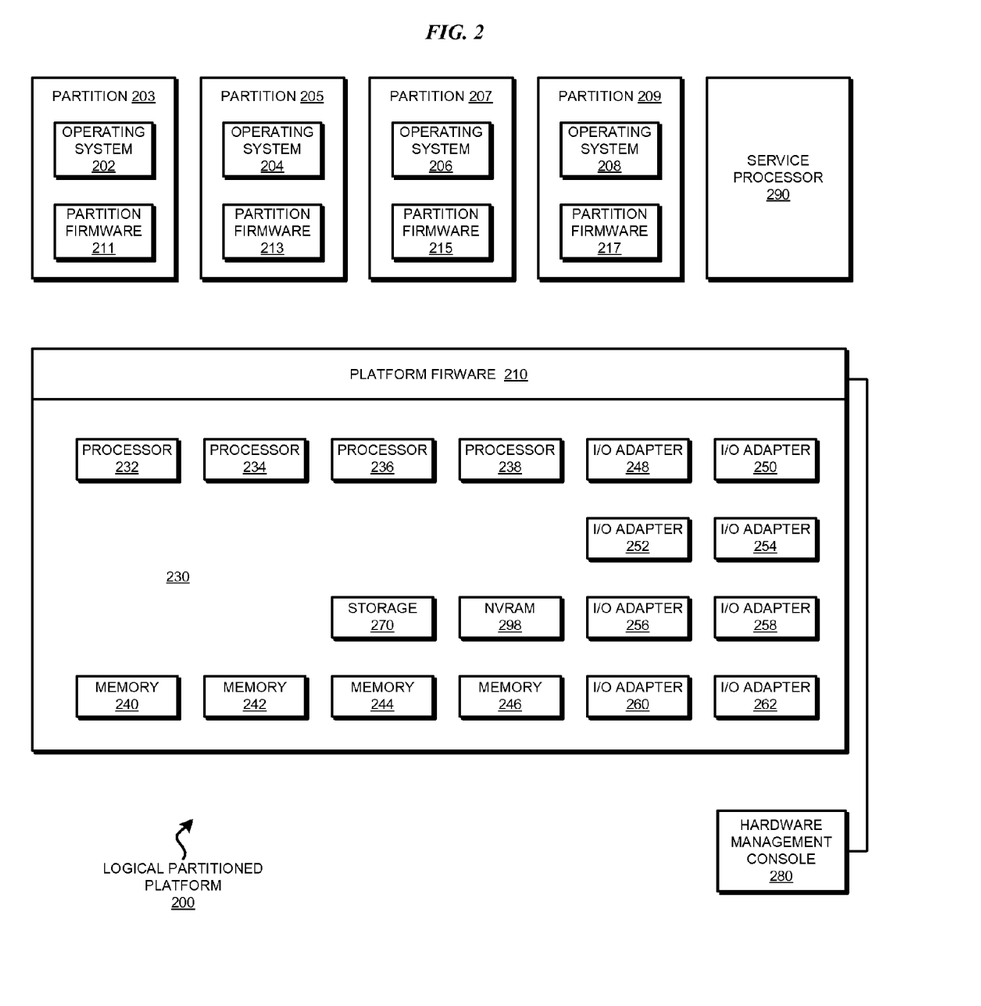
FIG. 2 depicts a block diagram of an example logical partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100. Among adapters 120-121 are network adapters that implement the mechanisms of messaging as required by MPI. Operating systems running on data processing 100 use network adapters 120-121 to drive messaging between applications running on data processing 100 and other similar data processing in the system.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses. However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. Of course, any type of operating system, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of bootstrap code is loaded onto partitions 203, 205, 207, and 209 by platform firmware 210. Thereafter, control is transferred to the bootstrap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
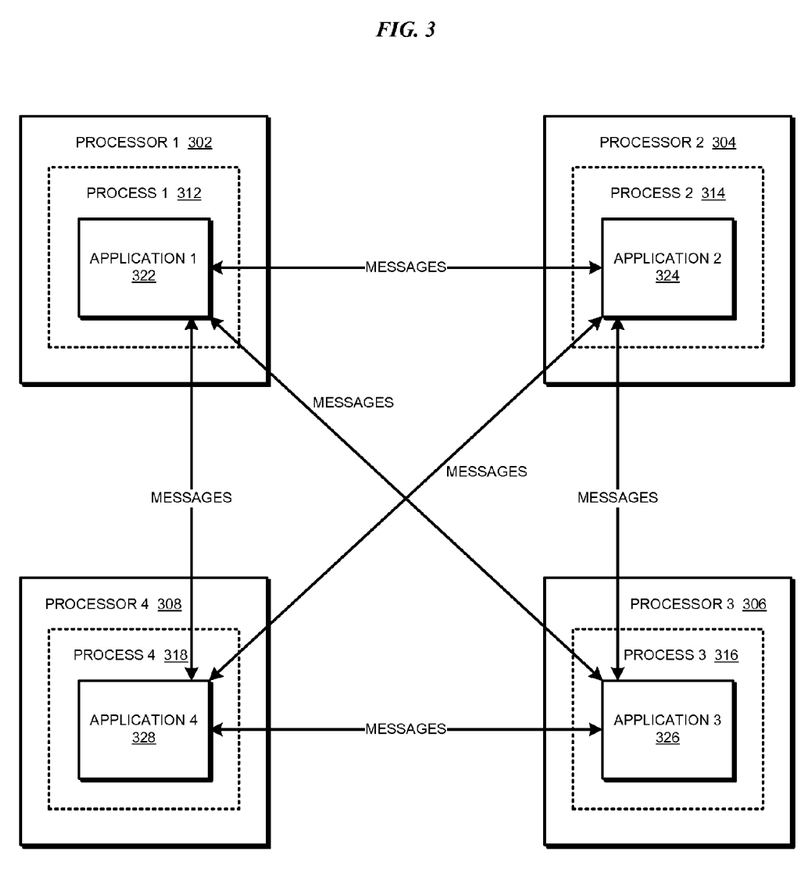
FIG. 3 depicts a block diagram of an example distributed computing environment executing a distributed application employing MPI with respect to which an illustrative embodiment may be implemented.

With reference to FIG. 3, this figure depicts a block diagram of an example distributed computing environment executing a distributed application employing MPI with respect to which an illustrative embodiment may be implemented. Processors 302, 304, 306, and 308, labeled "Processor 1", "Processor 2", "Processor 3", and "Processor 4" respectively may each be implemented using any of processors 101-104 in FIG. 1.

Processor 302 executes process 312, processor 304 executes process 314, processor 306 executes process 312, and processor 308 executes process 318. Process 312 may be associated with application 322 labeled "Application 1", process 314 may be associated with application 324 labeled "Application 2", process 316 may be associated with application 326 labeled "Application 3", and process 318 may be associated with application 328 labeled "Application 4". Applications 322, 324, 326, and 328 may be portions of a distributed application exchanging messages using MPI among any subset of those applications.

Figure 4:
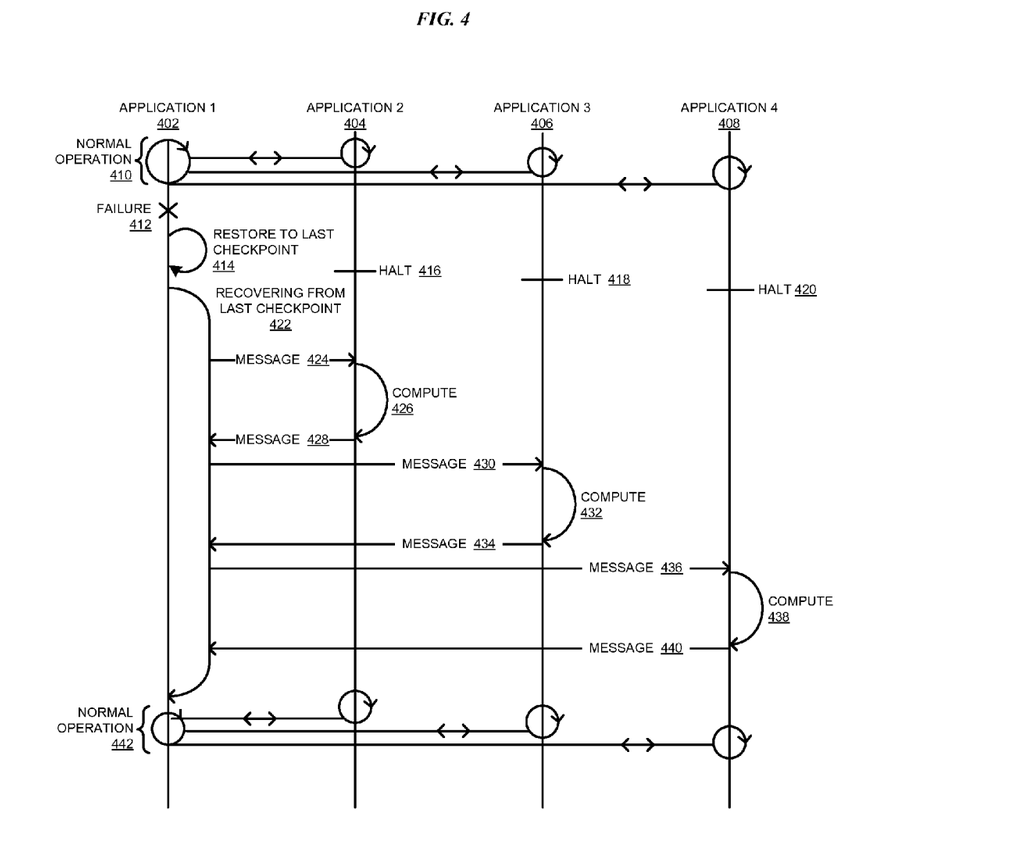
FIG. 4 depicts a diagram of a recovery operation in an MPI environment that can be improved using an illustrative embodiment.

With reference to FIG. 4, this figure depicts a diagram of a recovery operation in an MPI environment that can be improved using an illustrative embodiment. Applications 402, 404, 406, and 408 labeled "Application 1", "Application 2", "Application 3", and "Application 4" respectively, correspond to applications 322, 324, 326, and 328 respectively in FIG. 3.

Assume that applications 402, 404, 406, and 408 are engaged in normal operation 410, such as by sending and receiving messages using MPI in a distributed environment. Assume that application 402 experiences failure 412, perhaps due to a failure of the data processing system where application 402 may be executing.

With a presently available recovery method, while application 402 is restored 414 to the last checkpoint, applications 404, 406, and 408 are halted, paused, or otherwise prevented from progressing, depicted as halt 416, 418, and 420.

In recovery 422 from the last checkpoint, application 402 has to be restored to the state that existed in application 402 at the time of failure 412. During recovery 422, application 402 may resend message 424 to application 404. Application 404 may recompute 426 as needed in response to message 424 and may return message 428. In some presently available recovery methods, application 404 has to roll back to a prior state to enable the reproduction of message 428. This roll back to a prior state by application 404 that did not fail is often called sympathetic rollback.

Similarly, application 402 may resend message 430 to application 406. Application 406 may recompute 432 as needed in response to message 430 and may return message 434. Similarly, application 402 may resend message 436 to application 408. Application 408 may recompute 438 as needed in response to message 436 and may return message 440. In prior art of recovery methods, applications 406 and 408 may need to perform sympathetic rollbacks to regenerate messages 434 and 440, respectively.

Messaging similar to sending and receiving of messages 424, 428, 430, 434, 436, and 440 may occur one or more times before application 402 is restored to the state before failure 412. Once such state is restored, applications 402, 404, 406, and 408 may resume normal operation 442 in which some or all of those applications may make progress beyond the point in time of failure 412.

Figure 5:
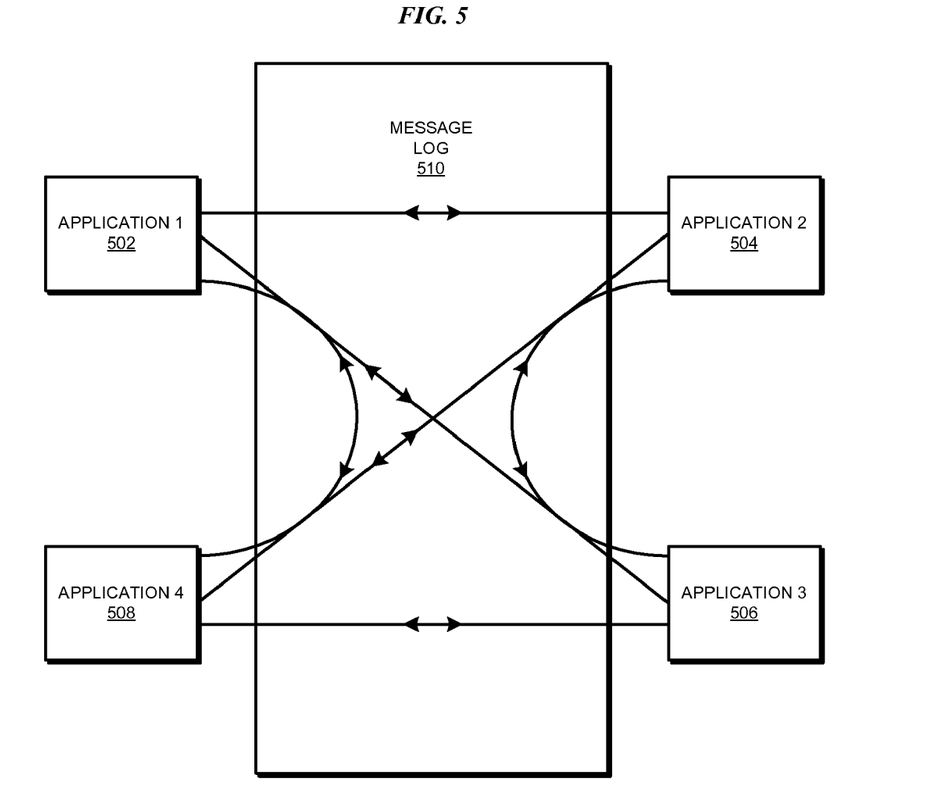
FIG. 5 depicts a block diagram of an example configuration for accelerating recovery in an MPI environment in accordance with an illustrative embodiment.
Figure 6:
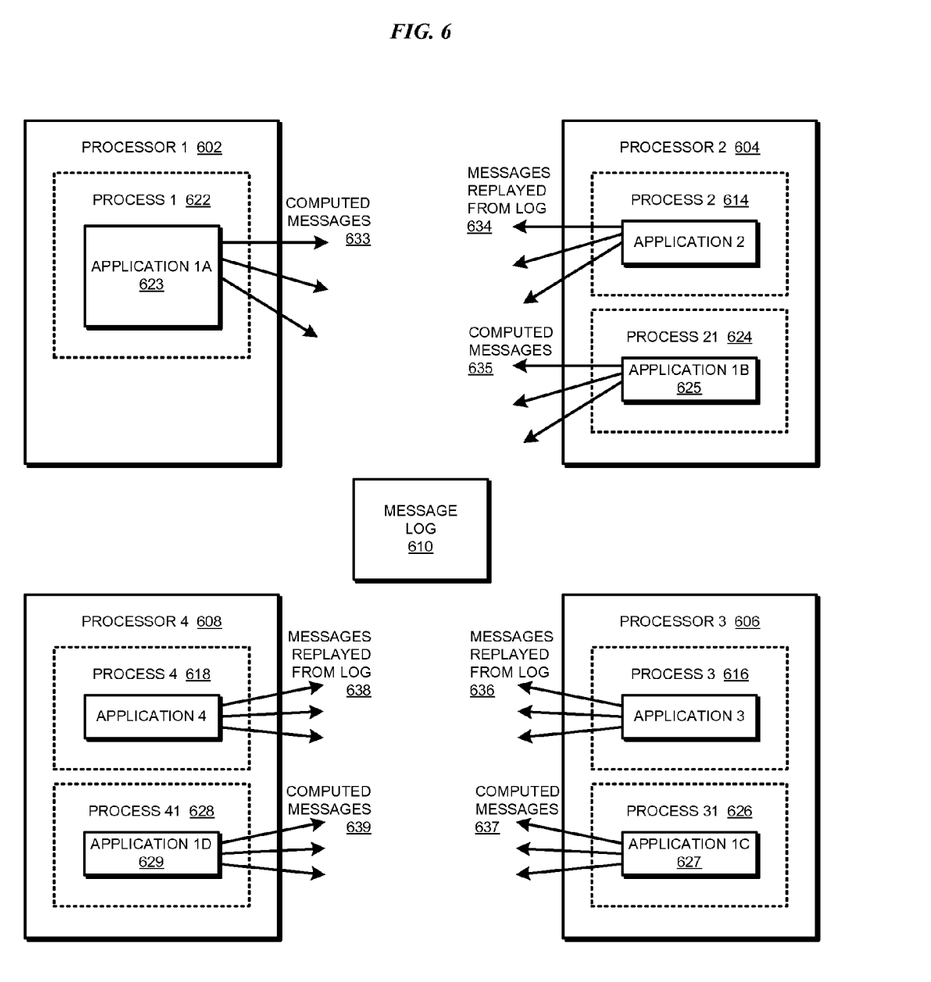
FIG. 6 depicts a block diagram of an example process of accelerating recovery in a MPI environment in accordance with an illustrative embodiment.

As the invention recognizes, the messaging and computations shown between restore 414 and normal operation 442 are computationally expensive. Moreover, sympathetic rollbacks may be expensive in resource usage and reperform computations that did not fail due to failure 412. Furthermore, the invention recognizes that such messaging and computations may be wholly or partially avoidable. FIGS. 5 and 6 describe one example way in which an embodiment of the invention can reduce the recovery cost and accelerate the recovery in a MPI environment such as depicted in FIGS. 3 and 4.

With reference to FIG. 5, this figure depicts a block diagram of an example configuration for accelerating recovery in an MPI environment in accordance with an illustrative embodiment. Applications 502, 504, 506, and 508 correspond to applications 402, 404, 406, and 408 in FIG. 4, and are similarly labeled.

Applications 502, 504, 506, and 508 utilize message log 510 during messaging. Messages sent or received between any subset of applications 502, 504, 506, and 508 are logged in message log 510. A message in message log 510 can be retrieved by the sender, receiver, or other application in applications 502, 504, 506, and 508. Message log 510 may be implemented using any data structure and data storage suitable for a given implementation without limitation on the invention.

With reference to FIG. 6, this figure depicts a block diagram of an example process of accelerating recovery in a MPI environment in accordance with an illustrative embodiment. Processors 602, 604, 606, and 608 may be similar to processors 302, 304, 306, and 308 in FIG. 3 respectively and are labeled similarly. Message log 610 may be similar to message log 510 in FIG. 5. Process 614 Labeled "Process 2" and executing "Application 2", Process 616 Labeled "Process 3" and executing "Application 3", and process 618 Labeled "Process 4" and executing "Application 4" may be implemented using their corresponding artifacts in FIG. 3 and may further include one or more modifications described herein.

For the operation of the configuration of FIG. 6, assume that "Application 1" (not shown) executing on processor 602 experiences a failure, such as failure 412 in FIG. 4. As different from the present method of recovery depicted in FIG. 4, "Application 1" may not be relegated to only processor 602.

Upon failure of "Application 1", "Application 2", "Application 3", and "Application 4" typically cannot progress without "Application 1" having caught up to the point of failure. Consequently, computing capacity becomes available on their respective processors, to wit, processor 604, 606, and 608. Therefore, instead of recovering "Application 1" by performing computations only using "Application 1" processor 602, "Application 1" may be executed as a version of original "Application 1" (such as application 402 in FIG. 4) that is distributable across processors with available capacity. Process 622 executing on processor 602 may execute a part of "Application 1", to wit, "Application 1A" 623. Process 624 may execute on processor 604 and may execute another part of "Application 1", to wit, "Application 1B" 625. Process 626 may execute on processor 606 and may execute another part of "Application 1", to wit, "Application 1C" 627. Process 628 may execute on processor 608 and may execute another part of "Application 1", to wit, "Application 1D" 629.

"Application 1A" 623, "Application 1B" 625, "Application 1C" 627, and "Application 1D" 629 may be portions of "Application 1", which itself may be a portion of a distributed application. Furthermore, parts of "Application 1" need not be executed on all available processors but only on a subset of processors as may be suitable.

Configured in this manner, application 623, 625, 627, and 629 perform in parallel, parts of the computations that "Application 1" would have to perform during recovery. Parallel execution of parts of a failed application in the manner of an embodiment may afford better utilization of computing resources and faster recovery time as compared to the present method of recovery.

Furthermore, message log 610 is used advantageously to avoid unnecessary recomputations in "Application 2", "Application 3", and "Application 4". While "Application 1" or parts thereof, to wit, applications 623, 625, 627, and 629 may have to perform computations relating to the messages that "Application 1" sent or received between the last checkpoint and the time of failure, "Application 2", "Application 3", and "Application 4" need not do so. Accordingly, an embodiment may cause "Application 2", "Application 3", and "Application 4" to simply replay their messages from the log for the benefit of the recovering "Application 1".

In other words, a part of "Application 1" recomputes and send computed messages 633, 635, 637, and 639 to "Application 2", "Application 3", and "Application 4". "Application 2", "Application 3", and "Application 4" may, instead of recomputing their responses, access message log 610, retrieve a suitable previously composed response from message log 610, and send that response as messages replayed from log 634, 636, and 638 respectively.

Thus, according to an embodiment, not only is "Application 1" able to recover faster by utilizing increased available processor capacity in the distributed environment, "Application 2", "Application 3", and "Application 4" can omit recomputations of data already computed for that recovery and can avoid performing wasteful sympathetic rollbacks. In one embodiment, a subset of the distributed portions, for example, only "Application 2" and "Application 3", may replay from the logs and other portions, such as "Application 4" may perform recomputations. In another embodiment, a part of the recovering portion, for example, "Application 1C" may also be able to avoid recomputations and instead of sending for example, computed messages 639, may be able to replay some messages from the log.

Applications 1A 623, 1B 625, 1C 627, and 1D 629 can be compiled by the programmer in anticipation of failure. For example, these applications could be derived from application 1 by subdividing the data structures further among additional processors. For example, a stencil computation popular in MPI environments would divide the portion of the matrices computed by Applicatio0n 1 into smaller portions distributed over 1A, 1B, 1C and 1D. Or, a data configuration tool or a compiler can reconfigure Application 1 to run as a parallel application during recovery by indicating finer distribution of the automated matrix allocation among additional processors.

An embodiment may also distribute more than one instance of a part of a recovering application. For example, more than one instance of application 623 may execute on processor 602, when possible for a given distributed application under a given distributed environment.

Figure 7:
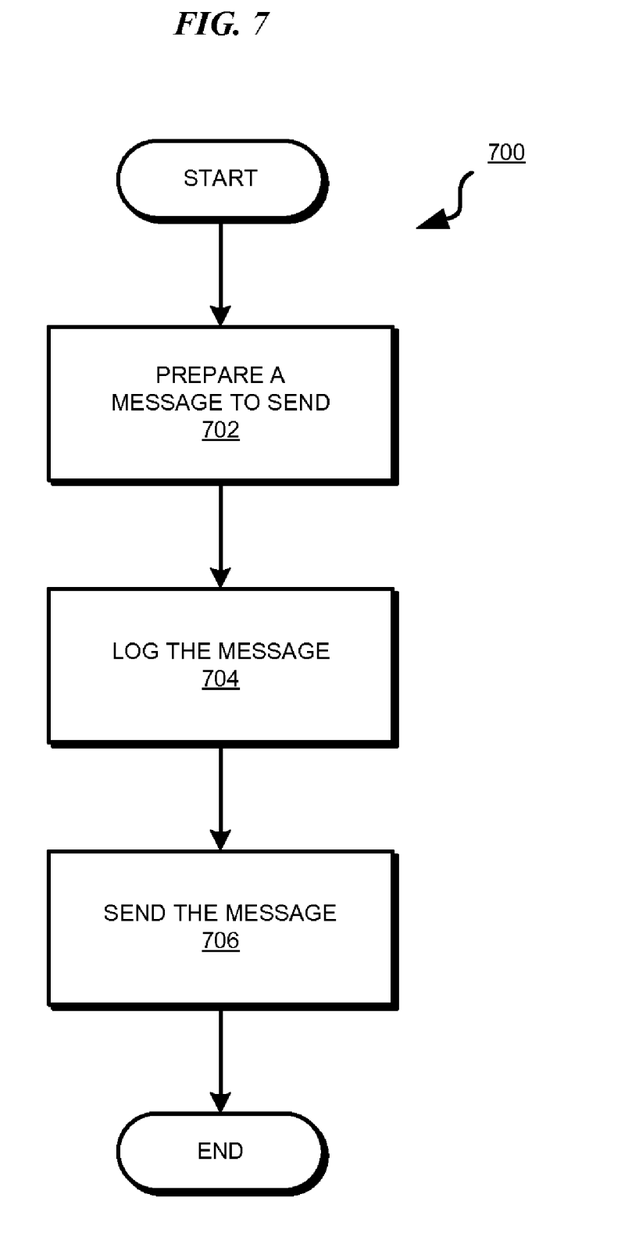
FIG. 7 depicts a flowchart of an example process for accelerating recovery in a MPI environment in accordance with an illustrative embodiment.

With reference to FIG. 7, this figure depicts a flowchart of an example process for accelerating recovery in an MPI environment in accordance with an illustrative embodiment. Process 700 may be implemented in a portion of a distributed application, such as any of applications 502, 504, 506, and 508 in FIG. 5.

Process 700 begins by preparing a message to send using MPI (step 702). Process 700 logs the message (step 704). For example, process 700 may perform step 704 using message log 510 in FIG. 5.

Process 700 sends the message using MPI (step 706). Process 700 ends thereafter. FIG. 7 depicts the operations performed when the sender maintains the message log. Those of ordinary skill in the art may appreciate that the operations depicted in FIG. 7 can also be performed at the receiver of the message, in the case the log is maintained by the receiver of the message.

Figure 8:
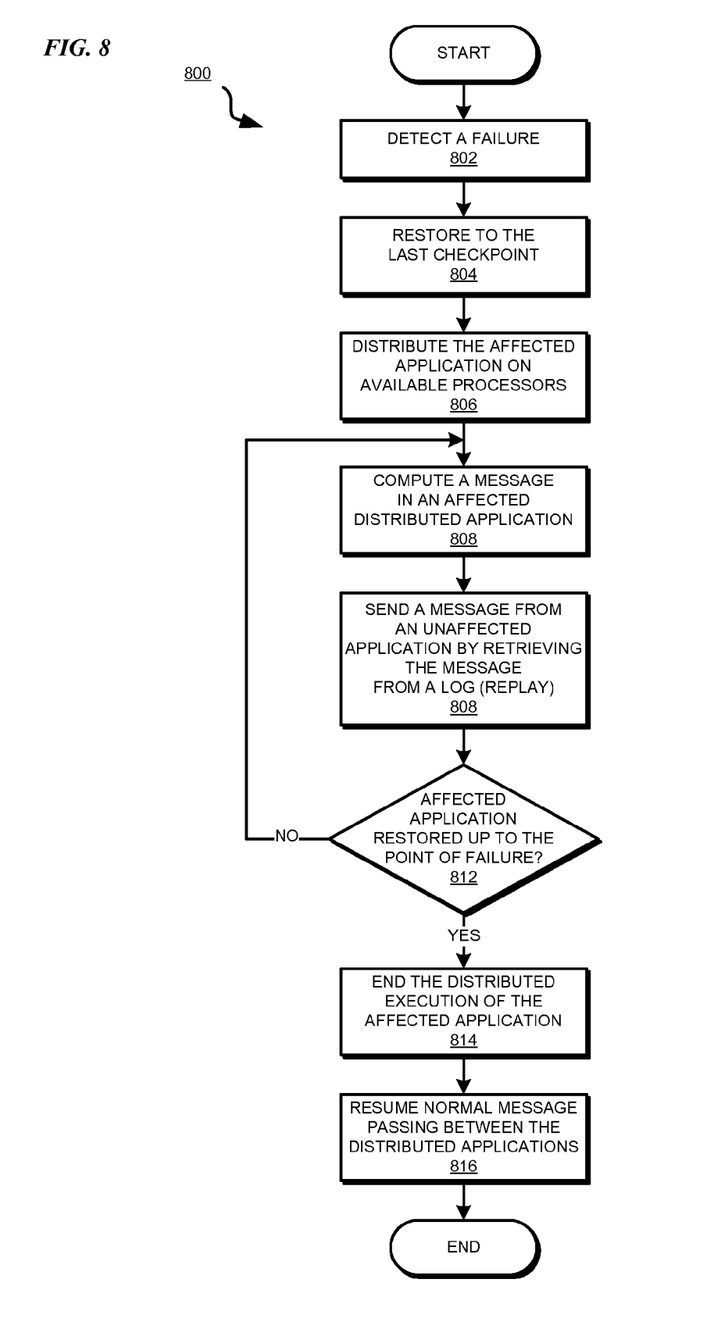
FIG. 8 depicts a flowchart of an example second process for accelerating recovery in a MPI environment in accordance with an illustrative embodiment.

With reference to FIG. 8, this figure depicts a flowchart of an example second process for accelerating recovery in a MPI environment in accordance with an illustrative embodiment. Process 800 may be implemented in a portion of a distributed application, such as any of applications 502, 504, 506, and 508 in FIG. 5.

Process 800 begins by detecting a failure of the application, subsystem, system, or any combination thereof, such as to require a recovery of a distributed application or a portion thereof (step 802). Process 800 restores the distributed application or the portion thereof to the last checkpoint (step 804).

Process 800 may distribute the affected application, such as application 402 in FIG. 4 or "Application 1" (described but not shown) in the description of FIG. 6 (step 806). For example, process 800 may distribute "Application 1" of FIG. 6 into applications 623, 625, 627, and 629 in FIG. 6, or any combination thereof. Each of the distributed parts of step 806 forms an affected distributed application.

Process 800 computes a message in an affected distributed application (step 808). For example, process 800 may compute one of computed messages 639 for application 629 in step 808.

Process 800 sends a message from an unaffected distributed application, such as "Application 2" in FIG. 6, by retrieving the message from a log, such as message log 610 in FIG. 6 (step 810). Process 800 determines whether the affected application has recovered up to the point of failure (step 812). If the affected application has not recovered up to the point of failure ("No" path of step 812), process 800 returns to step 808.

If the affected application has recovered up to the point of failure ("Yes" path of step 812), process 800 may end the distributed execution of affected distributed applications (step 814). In one embodiment, the distributed parts of the formerly affected application may continue execution in distributed mode, such as when doing so may advantageously utilize the available computing capacity in a given computation.

Process 800 resumes normal message passing, and computations related thereto, in the various portions of the distributed application (step 816). For example, process 800 may advance the state of the distributed application beyond the state that existed at the time of the failure. Process 800 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method is provided in the illustrative embodiments for accelerating recovery in an MPI environment. Using an embodiment of the invention, a distributed computing environment may be able to recover from a failure in operation of a distributed application faster than possible with currently available methods.

A certain number (four) of processors, processes, and applications are depicted and described in this disclosure only as an example and are not limiting on the invention. Any number of processors, having any number of processes executing thereon may be used within the scope of the invention. Furthermore, a processor may execute any number of applications, an application may execute using any number of processes, and multiple instances of an application may execute on a processor at any given time within the scope of the invention.

Furthermore, some parts of an affected application may be distributed to other processors and some parts may not. Some parts of an affected application may execute in multiple instances if suitable for a given distributed application.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a non-transitory computer usable storage medium including first computer usable code for accelerating recovery in a Message Passing Interface (MPI) environment, the first computer usable code comprising:
    computer usable code for causing a first portion of a distributed application to execute using a first processor and a second portion of the distributed application to execute using a second processor in a distributed computing data processing environment, the first and the second portions interacting using MPI;
    computer usable code for restoring, responsive to a failure of operation of the first portion of the distributed application, the first portion to a checkpoint;
    computer usable code for distributing a first part of the first portion to a third processor and a second part of the first portion to a fourth processor in the distributed computing data processing environment;
    computer usable code for performing a computation of the first portion using the first and the second parts in parallel;
    computer usable code for computing a first message in the first portion, the message having been initially computed after a time of the checkpoint and before a time of the failure;
    computer usable code for sending the first message to the second portion; and
    computer usable code for replaying a second message from the second portion without computing to create the second message in the second portion.

2. The computer usable program product of claim 1, wherein the replaying comprises:
    computer usable code for retrieving the second message from a message log; and
    computer usable code for sending the second message from the second portion to the first portion.

3. The computer usable program product of claim 1, further comprising:
    computer usable code for computing the second message between the time of the checkpoint and the time of the failure; and
    computer usable code for storing the second message in the message log.

4. The computer usable program product of claim 1, wherein computing the first message is computing the first message in the first part of the first portion.

5. The computer usable program product of claim 1, wherein the third processor is the first processor and the fourth processor is the second processor.

6. The computer usable program product of claim 1, further comprising:
    computer usable code for determining whether the first portion has recovered up to the time of failure;
    computer usable code for terminating, responsive to the determining being positive, the execution of the first and the second parts of the first portion;
    computer usable code for executing the first portion; and
    computer usable code for proceeding with the first and the second portions interacting using MPI to advance a state of the distributed application to a state after the time of failure.

7. The computer usable program product of claim 1, further comprising:
    computer usable code for determining whether the first portion has recovered up to the time of failure;
    computer usable code for terminating, responsive to the determining being positive, the execution of the first part of the first portion;
    computer usable code for executing the first portion using the first processor;
    computer usable code for continuing to execute the second part on the third processor; and
    computer usable code for proceeding with the first and the second portions interacting using MPI to advance a state of the distributed application to a state after the time of failure.

8. The computer usable program product of claim 1, further comprising:
   computer usable code for determining whether the first portion has recovered up to the time of failure; and
   computer usable code for proceeding, responsive to the determining being positive, with the first and the second portions interacting using MPI to advance a state of the distributed application to a state after the time of failure.

9. The computer usable program product of claim 1, wherein the first computer usable code is stored in the computer usable storage medium in a data processing system, and wherein the first computer usable code is transferred over a network from a remote data processing system.

10. The computer usable program product of claim 1, wherein the first computer usable code is stored in the computer usable storage medium in a server data processing system, and wherein the first computer usable code is downloaded over a network to a remote data processing system for use in a computer usable storage medium associated with the remote data processing system.

* * * * *